Sept. 13, 1966  L. J. HAULIK ETAL  3,272,542

RESILIENT CONNECTING DEVICE

Filed Oct. 17, 1963

INVENTORS
LEO J. HAULIK
LEONARD S. GREER
BY CLARENCE W. DECKER

Charles L. Lovenbuch
atty.

3,272,542
RESILIENT CONNECTING DEVICE
Leo J. Haulik, Leonard S. Greer, and Clarence W. Decker, Erie, Pa., assignors to Hays Manufacturing Company, Erie, Pa., a corporation of Pennsylvania
Filed Oct. 17, 1963, Ser. No. 316,988
5 Claims. (Cl. 285—189)

This invention relates to valves or connections and, more particularly, to valves or connections for connecting branches to relatively large fluid pipe lines.

This application is an improvement over patent application, Serial No. 156,050, filed November 30, 1961, by Richard T. Windsor, which issued as Patent No. 3,131,953 on May 5, 1964.

Connections to relatively large pipe lines such as water mains have usually been made by means of tapping machines which bore and thread an opening in the pipe and insert a valve when the contents of the pipe are under pressure. This requires special complex equipment.

The present invention contemplates an attaching means for a valve or connection which will not require the operation of tapping the pipe. It is also suitable for use in pipes made of cement and other materials which cannot readily be threaded. The device disclosed herein can be readily inserted in a plain opening in a pipe and firmly anchors the valve or other member thereon. The device not only locks the member in place but also electrically insulates it from the pipe. The sleeve also makes a non-rigid connection between the member and the pipe so that it allows lateral relative movement of the member or branch relative to the pipe. This is important where branches are connected to mains under streets or in soil which may settle in a non-uniform manner. Insulation against vibration between the pipe and the branch is also provided.

It is, accordingly, an object of the present invention to provide an improved valve and means for connecting the valve to a pipe.

Another object of the invention is to provide an improved attaching means for connecting a branch line to a pipe line.

A further object of the invention is to provide a connector or valve which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit thereof or sacrificing any of the advantages of the invention.

Figure 1:
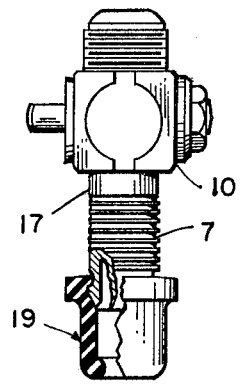
FIG. 1 is a cross sectional view of an improved attaching means for a valve or connection according to the invention.

Now with more specific reference to the drawing wherein like numerals refer to the same parts throughout the various views thereof, a valve body 10 is shown which may be part of a suitable corporation stop, connection, or the like which is to be connected to a pipe service line such as a main line or pipe 11.

Instead of connecting a plate to a member, the same structure recited could be used to connect a bolt to a beam or plate as in mounting lamps to insulate against electric current flow and vibrations and to seal and fix it thereto. The vibration insulation is especially important when there may be a difference in frequency of vibration between a water main and a branch line. The valve could also be connected to a plate or other fixed member instead of to a pipe as shown. The valve body shown can also be considered to represent any suitable connection between two members. The main lines 11 may be made of steel, cement, or other metallic or non-metallic material.

The line or pipe 11 has a smooth hole 16 formed therein. The hole may be formed with a suitable drilling machine of any well known type, if the pipe is under pressure. The valve body 10 will be generally cylindrical and have a cylindrical portion 17 suitable to be received in a flexible sleeve 19. The pipe 11 could be cylindrical or any other shape or it could be a plate.

The lower end of the cylindrical portion 17 of the valve terminates in a frusto-conical end 30. An annular groove is formed in the end which defines a seat 12 for receiving an annular member 20 on the end of the sleeve 19. A flange 22 on the sleeve 19 overlies the outside of the pipe and holds the device in position during assembly.

The insert device or sleeve 19 may be made of rubber, plastic, or other elastometric material having suitable characteristics of resiliency and flexibility and, in its undeflected condition as shown in FIG. 1, it has a generally cylindrical body 18 terminating at its lower end in the annular member 20.

The cylindrical body 18 could be thinner than the clearance between the cylindrical portion 17 and the inside of the hole 16 under certain conditions. In this event, the entire sealing and fastening would depend upon the annular member 20 which will be squeezed into the groove or seat 12 when the valve is urged outwardly, thereby preventing its removal.

The annular member 20 has a cross sectional diameter greater than the wall thickness of the cylindrical body 18 and it extends inwardly therefrom. The annular member 20 extends into the groove 12. The flange 22 extends outwardly at the upper end and when the sleeve 19 is in position, the flange 22 overlies the pipe 11. The groove 12 is defined by a surface 38 which terminates at the outside of a flange 31 of the valve body 10.

An internal groove 27 has the same contour as the groove 12 so that the groove 27 can receive the end of the frusto-conical end 30. Therefore, during insertion of the sleeve 19 and valve in the stage shown in FIGS. 1 and 2, the arcuate portion of the groove 12 is co-extensive with a complementary portion 29 of the sleeve 19 and the end or surface 30 rests on a surface 35 of the sleeve. This aids in starting the sleeve and valve properly into the hole 16.

A suitable material for making the sleeve 19 has been found to be rubber having a darometer of seventy. This rubber is confined in the groove after assembly and resists removal of the body 10.

Figure 2:
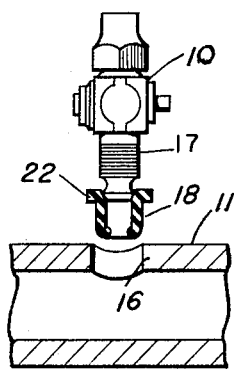
FIG. 2 is a cross sectional view of a pipe showing a smooth hole formed therein for receiving the valve.
Figure 3:
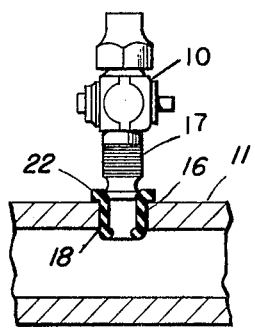
FIG. 3 is a cross sectional view similar to FIG. 2 showing the sleeve inserted in the pipe.
Figure 4:
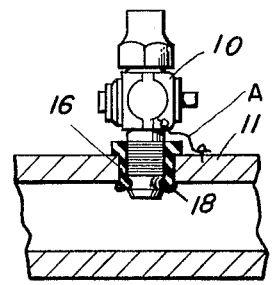
FIG. 4 is a cross sectional view similar to FIG. 1 showing the valve and seat in operative position.
Figure 5:
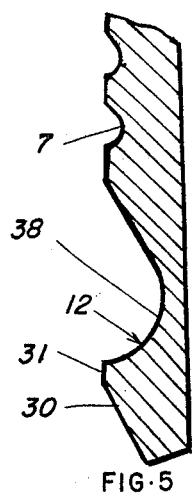
FIG. 5 is an enlarged partial cross sectional view of the lower end of the valve body.
Figure 6:
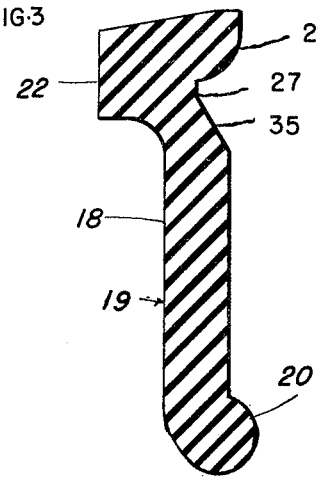
FIG. 6 is an enlarged cross sectional view of the sleeve.

To insert the valve body or connection into the pipe, a hole such as the hole 16 is formed in the pipe (FIG. 2). The sleeve or insert device 19 is then inserted into the hole 16 as shown in FIG. 3. Sleeve 19 need not be a tight fit in the hole 16. The hole will be of only slightly larger diameter than the outside diameter of the sleeve 19. The sleeve has a slightly smaller internal diameter than the outside diameter of the cylindrical portion 17.

As the valve is forced through the sleeve 19, the sleeve being disposed in the hole 16, it will compress the sleeve between the walls of the hole and the cylindrical portion 17. The operator will continue to push the body 10 into the sleeve until the annular member 20 of the sleeve snaps into the groove 12 with a substantial band of rubber underlying the inside wall of the pipe. This will hold the valve body or connection against removal. The cross sectional radius of the surface 38 of the groove 12 will be of substantially the same radius as the annular member 20 and will be approximately the same depth as the cross sectional radius of the annular member 20.

An example of relative dimension of the sleeve and cylindrical portion is:

|  | Inches |
|---|---|
| Outside diameter of sleeve | 1.227 |
| Thickness of sleeve | .187 |
| Diameter of cylindrical portion 17 | 1.090 |
| Annular member 20 | .215 |

Since the cross sectional diameter of the annular member 20 is greater than the difference between the diameter of the outer edge of the flange 31 and the diameter of the hole 16 and since the walls of the sleeve 19 are thicker than the space between the cylindrical portion 17 of the valve body 10 (the inside of the hole), the rubber at the annular member 20 will be thicker and cannot be removed without shearing the annular member 20 around its entire circumference. It will be seen that the diameter of the hole 16 is only slightly larger than the outside diameter of the flange 31 which is substantially the same size as the cylindrical portion 17.

When the cylindrical portion 17 of the valve body or connection is in the sleeve and the sleeve is in the hole 16, the resilient member is deformed so that rubber material is forced into a shape which will cause the pressure in the pipe to increase the effectiveness of the seal since the pressure will tend to push the rubber in the annular member 20 into a space through which it cannot pass. The cylindrical body can be of various lengths to accommodate pipes of different thicknesses.

Due to the series of small grooves 7 and one large groove 12 on the straight cylindrical portion 17 of the body 10, when the body is inserted through the inside diameter of the sleeve 19, the displaced rubber moves into these small grooves 7. The annular end member 20 of the sleeve 19 seats in the large groove 12 of the body 10.

The radial pressure created by the outside diameter of the cylindrical portion 17 against the inside diameter of the sleeve 19 at the small grooves 7 makes a seal which prevents leakage from the large pipe 11 between the rubber sleeve 19 and the cylindrical portion 17.

The semi-rigid annular member 20 on the end of the rubber sleeve 19 locks into the large groove 12 on the cylindrical portion 17. Therefore, the water pressure from the inside of the large pipe 11 against the end of the rubber sleeve and body creates an O-ring type action on the semi-rigid annular member 20 of the sleeve against the body and the bottom edge of the hole in the large pipe, preventing the valve and sleeve from being forced out by fluid pressure. The grooves 7 will receive rubber forced therein which will also prevent leakage and removal of the body. So long as the coefficient of friction between the materials is significant, the rubber sleeve forms a hydraulic seal as well as a locking device itself.

In using a machine to assemble the device in a pipe under pressure, the valve or connection will be assembled to the mandrel in a suitable machine well known to those skilled in the art. The cylindrical portion 17 may be lubricated, the sleeve 19 positioned as shown in FIG. 1, and the machine assembled to the pipe 11 and the hole drilled. The machine will then be properly indexed and the sleeve 19 will drop into the hole 16. The jackscrew on the machine will then be tightened until the valve or connection bottoms on the shoulder of the sleeve 19. The machine can then be removed and the valve or connection is completely assembled.

In applications where it is desirable to have an electrical connection between the valve and the pipe, a member A can be connected to the valve and to the pipe by any well known fastening means. The member A will be made of an electrical conducting material such as copper, for example.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a pipe having a relatively thick wall and a sealing sleeve for sealingly supporting a branch member communicating with the inside of said pipe adapted to have a second member on the outer end thereof,
   said pipe having an opening therein,
   said branch member having a cylindrical portion disposed in said opening,
   an end of said portion extending through said opening into said pipe,
   said end of said portion being of constant diameter,
   a groove in said end,
   said sealing sleeve being made of flexible resilient material and disposed in said opening over said cylindrical end,
   and a thickened portion homogenous with the remainder of said sleeve and made of homogenous material throughout on the inner end of said sleeve disposed in said groove in said end,
   said sleeve in its undistorted form being thicker than the space between the outside of said cylindrical portion and the inside surface of said opening.

2. The combination recited in claim 1 wherein
   said cylindrical portion of said branch member has spaced external peripheral grooves therein receiving said resilient material,
   said resilient sleeve being distorted into said grooves.

3. The combination recited in claim 1 wherein
   said thickened portion is round in cross section and has a cross sectional diameter greater than the thickness of said sleeve.

4. The combination recited in claim 1 wherein
   said thickened portion is thicker than the wall thickness of said sleeve and approximately twice the depth of said groove in thickness.

5. The combination recited in claim 1 wherein
   said cylindrical portion has a frusto-conical portion on the end adjacent said groove,
   and said sleeve has a groove therein adapted to receive said frusto-conical portion and the portion of said valve adjacent said groove prior to insertion in said opening.

References Cited by the Examiner

UNITED STATES PATENTS

| 1,789,079 | 1/1931 | Simpson | 137—317 |
| 2,461,656 | 2/1949 | Norman | 285—189 X |
| 2,813,568 | 11/1957 | Kilmarx | 285—208 |
| 3,076,668 | 2/1963 | Famely | 285—159 |
| 3,129,020 | 4/1964 | Bujnowski | 285—189 |
| 3,131,953 | 5/1964 | Windsor | 285—189 |

M. CARY NELSON, *Primary Examiner.*

W. R. CLINE, *Assistant Examiner.*